(12) United States Patent
McLenaghan (10) Patent No.: US 12,319,192 B2
(45) Date of Patent: Jun. 3, 2025

(54) LOADING AND TRANSPORT SYSTEM WITH INDEPENDENTLY ACCESSED LOADING POSITIONS

(71) Applicant: Michael McLenaghan, Phoenix, AZ (US)

(72) Inventor: Michael McLenaghan, Phoenix, AZ (US)

(73) Assignee: Michael McLenaghan, Phoenix, AZ (US)

( * ) Notice: Subject to any disclaimer, the term of this patent is extended or adjusted under 35 U.S.C. 154(b) by 562 days.

(21) Appl. No.: 17/841,359

(22) Filed: Jun. 15, 2022

(65) Prior Publication Data

US 2023/0406188 A1    Dec. 21, 2023

(51) Int. Cl.
| | |
|---|---|
| *B60P 3/07* | (2006.01) |
| *B60P 1/48* | (2006.01) |
| *B60P 1/50* | (2006.01) |
| *B62D 65/02* | (2006.01) |
| *B60P 3/10* | (2006.01) |

(52) U.S. Cl.
CPC ............... *B60P 3/07* (2013.01); *B60P 1/483* (2013.01); *B60P 1/50* (2013.01); *B60P 3/1033* (2013.01); *B62D 65/02* (2013.01)

(58) Field of Classification Search
CPC   B60P 3/07; B60P 3/1033; B60P 1/483; B60P 1/50; B60P 1/02; B60P 1/48; B60P 3/08; B62D 65/02; B25J 9/0087
USPC ............................................................ 410/4
See application file for complete search history.

(56) References Cited

U.S. PATENT DOCUMENTS

| | | | | |
|---|---|---|---|---|
| 3,084,970 A | * | 4/1963 | Day ................... | B60P 3/08 410/29.1 |
| 4,239,275 A | * | 12/1980 | Horneys .............. | B60P 3/08 414/478 |
| 5,853,279 A | * | 12/1998 | Neugebauer ......... | B60P 3/122 414/500 |

* cited by examiner

*Primary Examiner* — Amy R Weisberg
*Assistant Examiner* — Philip Charles Adams (57) ABSTRACT

A loading and transport system is disclosed that engages with a transporting vehicle such as a hauler or semi-truck. The system includes a plurality of transporting components including platforms or compartments that are accessible independently for efficiently loading and unloading objects including vehicles or freight boxes.

20 Claims, 8 Drawing Sheets

LOADING AND TRANSPORT SYSTEM WITH INDEPENDENTLY ACCESSED LOADING POSITIONS

FIELD

The present disclosure is directed to truck and trailer systems for transporting multiple vehicles or other transportation items. In particular, the trailer systems disclosed include a plurality of transporting components such as platforms that are configured to assume independently accessible loading positions.

BACKGROUND

Conventionally, transport vehicles such as haulers may transport multiple vehicles (e.g., automobiles, motorcycles, watercraft, recreational vehicles, etc.) by loading them one at a time over the rear of the transport vehicle and then removing them in reverse sequence. To access vehicles in the middle of the sequence, the transport vehicle would need to first move vehicles at the end of the sequence out of the way during loading or unloading. To prevent the need for out of sequence access to vehicles, vehicle transport brokers often contract for the transport of multiple vehicles by arranging for quantities of vehicles at one pick-up point and delivering multiple vehicles to a different drop-off point. However, this naturally reduces efficiency.

A need exists to develop truck or trailer systems for vehicle haulers that can provide more efficient access to any vehicle positioned along the vehicle hauler without the need to move other vehicles out of the way to access a vehicle in the middle of the load sequence.

BRIEF SUMMARY

In one aspect, a transport system is provided for transporting one or more vehicles. The transport system may include a first platform configured for attachment to a chassis behind a cab of a transporting vehicle that loads and unloads a first vehicle along a back side of the transporting vehicle. The transport system may also include a second platform configured to engage the transporting vehicle along a front side of the transporting vehicle that loads and unloads a second vehicle along a front side of the transporting vehicle opposite the back side. The transport system may also include a first pair of lifting arms coupled to the second platform that lift the second platform from the front side of the transporting vehicle. The transport system may also include a third platform configured to engage the transporting vehicle along the back side that loads and unloads a third vehicle and a second pair of lifting arms coupled to the third platform for lifting the third vehicle from the back side of the transporting vehicle. The transport system may further include two or more actuators that reposition the second and third platforms, wherein the first, second, and third platforms are accessible independently for loading and unloading the first, second, and third vehicles, respectively.

In another aspect, a method of making a transport system is provided. The method may include forming a first platform configured to engage a transporting vehicle that loads and unloads a first vehicle along a back side of the transporting vehicle. The method may also include forming a second platform configured to engage the transporting vehicle along a front side of the transporting vehicle that loads and unloads a second vehicle along the front side of the transporting vehicle opposite the back side. The method may also include coupling a first pair of lifting arms to the second platform that lift the second platform from the front side of the transporting vehicle. The method may also include forming a third platform configured to engage the transporting vehicle along the back side that loads and unloads a third vehicle. The method may also include coupling a second pair of lifting arms to the third platform for lifting the third vehicle from the back side of the transporting vehicle. The method may include operatively engaging two or more actuators along the first pair of lifting arms and the second pair of lifting arms, the two or more actuators configured to reposition the second and third platforms such that the first, second, and third platforms are accessible independently for loading and unloading the first, second, and third vehicles, respectively.

In another aspect, a transport system may include a first transporting component configured to engage a transporting vehicle that loads and unloads a first object along a back side of the transporting vehicle. The transport system may also include a second transporting component configured to engage the transporting vehicle along a front side of the transporting vehicle opposite the back side, the second transporting component adapted to load and unload a second object along the front side of the transporting vehicle. The transport system may also include a first pair of lifting arms coupled to the second transporting component that lift the second transporting component from the front side of the transporting vehicle. The transport system may also include a third transporting component configured to engage the transporting vehicle along the back side that loads and unloads a third object and a second pair of lifting arms coupled to the third platform for lifting the third object from the back side of the transporting vehicle. The transport system may further include two or more actuators that reposition the second and third platforms, wherein the first, second, and third platforms are accessible independently for loading and unloading the first, second, and third objects, respectively.

In another aspect, a transporting system is provided for transporting freights. The transporting system may include a first compartment attached to a chassis behind a cab of a transporting vehicle and configured to load and unload a first set of boxes of freights. The transporting system may also include a second compartment configured to engage the transporting vehicle to be above the cab and adapted to load and unload a second set of boxes of freights along a front side of the transporting vehicle. The transporting system may also include a first pair of lifting arms coupled to the second compartment for lifting the second compartment from the front side of the transporting vehicle. The transporting system may further include a third compartment configured to engage the transporting vehicle and adapted to load and unload a third set of boxes of freight along a back side opposite the front side, and a second pair of lifting arms coupled to the third compartment for lifting the third compartment from the back side of the transporting vehicle. The transporting system may further include two or more actuators that reposition the second and third compartments. The first, second, and third compartments are accessible independently for loading and unloading the first, second, and third set of boxes of freights, respectively.

In some aspects, the first compartment has a first temperature, the second compartment has a second temperature lower than the first temperature.

In some aspects, the third compartment has a third temperature different from the first temperature and the second temperature.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein:

In FIG. 7, the transport systems has been duplicated on a trailer that can be towed behind a power vehicle to provide additional loading positions. The trailer can be decoupled from the power vehicle to access the forward loading positions independently.

DETAILED DESCRIPTION

The present disclosure may be understood by reference to the following detailed description, taken in conjunction with the drawings as described below. It is noted that, for purposes of illustrative clarity, certain elements in various drawings may not be drawn to scale.

In general, the present disclosure refers to a truck or trailer system, also referred to as a transport system, ground loader system, and collectively "system," for transporting multiple transporting objects, such as vehicles, freight boxes, and the like. In some embodiments, the system includes three or more transporting components, such as platforms, for independently loading/unloading the transporting objects (e.g., freight and/or vehicles). In like embodiments, vehicles of the system are accessible independently as described herein. In addition, the system allows vehicles to be loaded on platforms and unloaded from the platforms without moving other vehicles.

Accordingly, the disclosed system is believed to provide a technical improvement in the subject art because it provides better utilization of the space in a general truck or trailer system. The disclosed system reduces the delivery time for vehicle haulers and allows the user to drive the most efficient route without considering the order of accessing the vehicles. Further, the disclosed truck or trailer system also allows the vehicle hauler to avoid turning a truck around on a crowded street or freeway.

Figure 1:
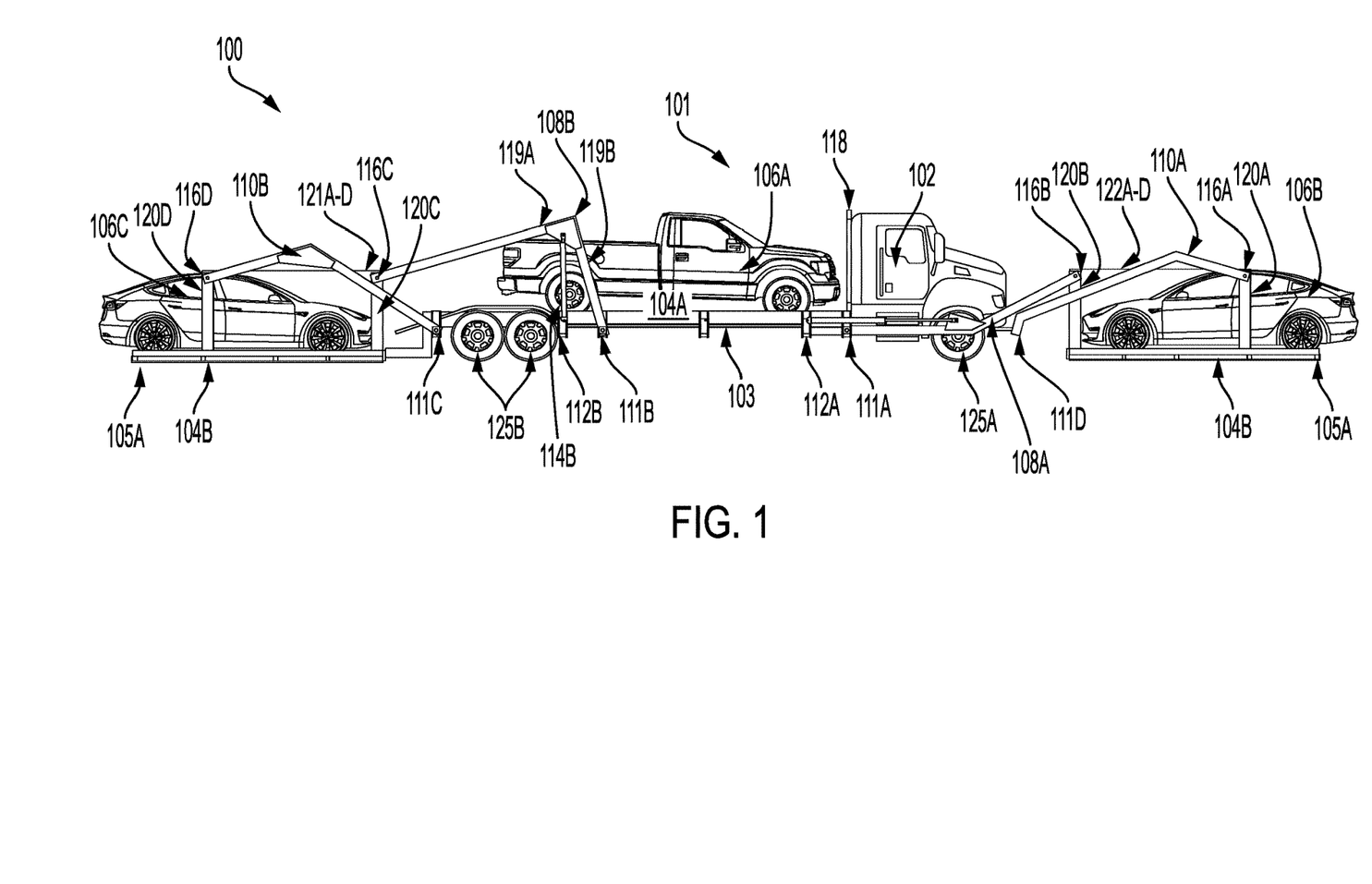
FIG. 1 illustrates a side view of a transport system configured for a truck including three platforms in a loading position in accordance with an embodiment of the disclosure.
Figure 2:
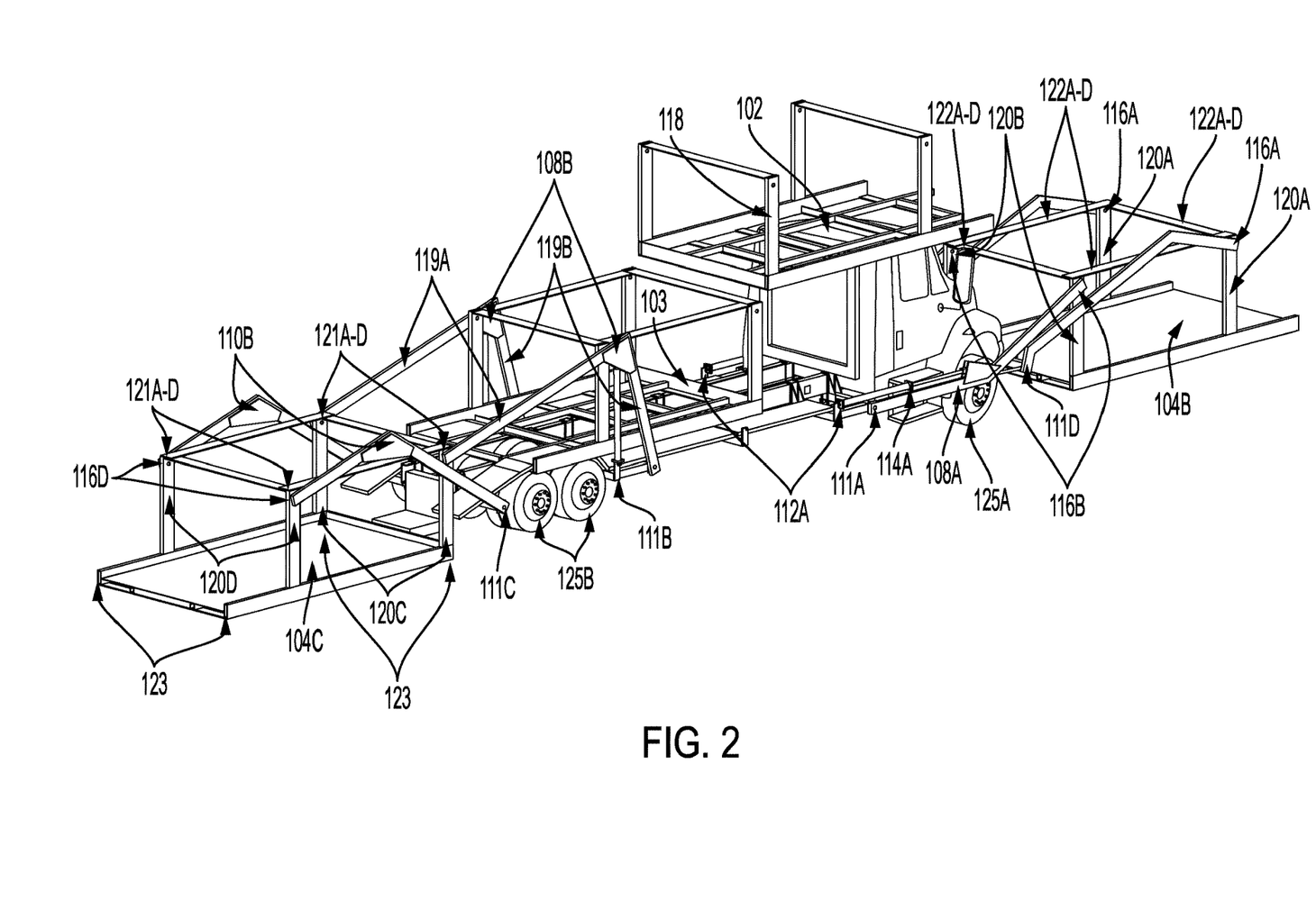
FIG. 2 illustrates a perspective view of the system including three platforms in the loading position of FIG. 1 in accordance with an embodiment of the disclosure.

FIG. 1 illustrates a side view of a transporting system (that can be engaged to a truck) including three platforms in a loading configuration in accordance with an embodiment of the disclosure (hereinafter "system 100"), and FIG. 2 illustrates a perspective view of the transporting system including the three platforms of FIG. 1 in a loading (unloaded) configuration in accordance with an embodiment of the disclosure. As illustrated in FIGS. 1 and 2, the system 100 is configured for a transporting vehicle 101 defining a cab 102. The system 100 includes a chassis 103 that may be mounted or positioned along the cab 102 as shown, and front wheels 125A and back wheels 125B defined along the chassis 103. The transporting vehicle 101 includes any type, form, or variation of a truck, hauler or other such transporting vehicle, and the cab 102 includes any cab component often found in truck commercial vehicles. Instead of supplying the customer with a factory pre-assembled flatbed, cargo container, or other equipment, the transporting vehicle 101, utilizing the system 100 as described allows the customer to add any desired equipment, such as vehicles or freights, which can be customized for the specific needs of the customer.

The chassis 103 provides the general load-bearing framework for the system 100 and cab 102, and structurally supports a first platform 104A of the system 100 positioned along the back of the cab 102. The first platform 104A is attached to chassis 103 (shown in FIG. 2) behind a head rack 118 of the system 100 defined along the cab 102 as shown. The first platform 104A is configured to receive and transport a first object such as a first vehicle 106A, which can be loaded to along the first platform 104A with conventional ramps and the like.

Referring to FIGS. 1-6, the head rack 118 supports a forward ground loading platform, also referred to as a second platform (104B). More specifically, the system 100 also includes a second platform 104B configured to receive and load a second object such as a vehicle 106B. The second platform 104B includes a first pair of vertical bars 120A and a second pair of vertical bars 120B extending upward from its planar base 105A (FIG. 6) as illustrated in FIG. 2-6. The first pair of vertical bars 120A are positioned at a greater distance from the front of cab 102 than the second pair of vertical bars 120B. These vertical bars (120) are coupled to lifting arms and slave arms as described below such that the second platform 104B can be lifted by the lifting arms and slave arms.

The system 100 further includes a first pair of lifting arms 108A coupled at forwarding pivot points 111A that are connected to the chassis 103 with brackets 113A (FIG. 6) that move the pivot points to the extreme outside dimension of the loading vehicle below and behind the cab 102 at bottom of head rack 118. The first pair of lifting arms 108A, which is the second set of vertical arms from the front of the cab 102, is fastened at the top ends at pivot 116B which is coupled to the vertical bars 120B of the second platform 104B. In addition, the arms 108A have bottom ends at pivot points 111A that hold the second platform 104B parallel to the pivot points 111A and 111D on the chassis 103.

The system 100 also includes a first pair of slave arms 110A that have top ends at pivot point 116A which is coupled to the top ends of the vertical bars 120A. The first pair of slave arms 110A are attached at the bottom just forward and below the forward end of the chassis at pivot point 111D which are attached to brackets 113D (FIG. 6) that bring the pivot points to the extreme outside dimension of the transport vehicle. The top ends of the first pair of vertical slave arms 110A are attached to the vertical arms (120) on platform 104B at pivot point 116A (FIG. 5-6) that hold the second platform 104B parallel to the chassis 103 at pivot points 111D on the chassis 103 and pivot points (116) on the second platform 104B. Platform 104B is suspended below the two lifting and slave arms by the four vertical bars (120) on the second platform 104B at pivot points (116) on both the lifting arms and the slave arms to provide the correct geometry for moving the platform 104B from the ground to the loaded position and vice versa while maintaining the second platform 104B in a parallel configuration relative to the chassis 103. All four pivot points (111, 116) may be the exact same horizontal distance apart and the exact same vertical distance apart to keep the second platform 104B parallel with the chassis.

Figure 5:
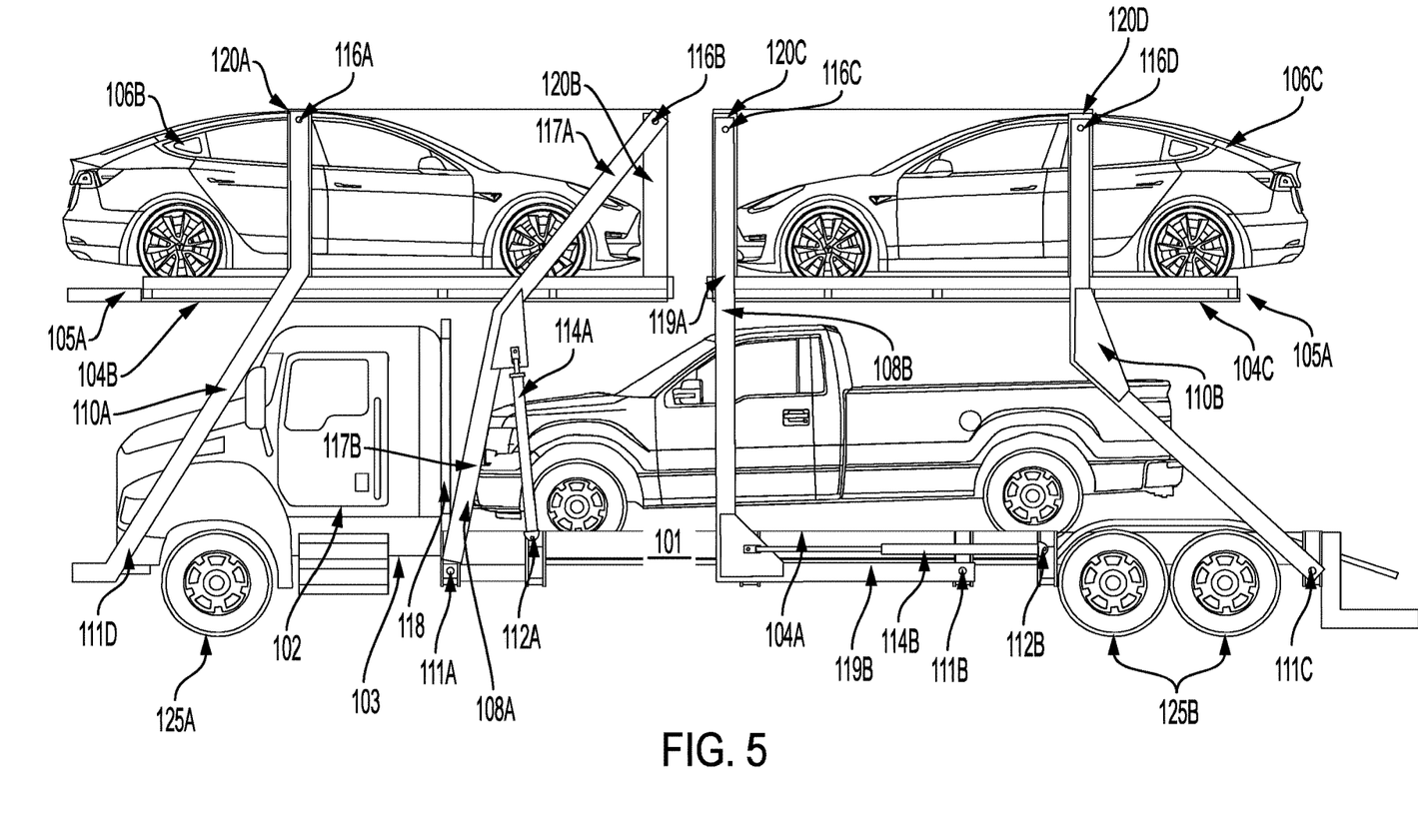
FIG. 5 illustrates a side view of a system including three platforms with three vehicles in fully loaded positions in accordance with an embodiment of the disclosure.
Figure 6:
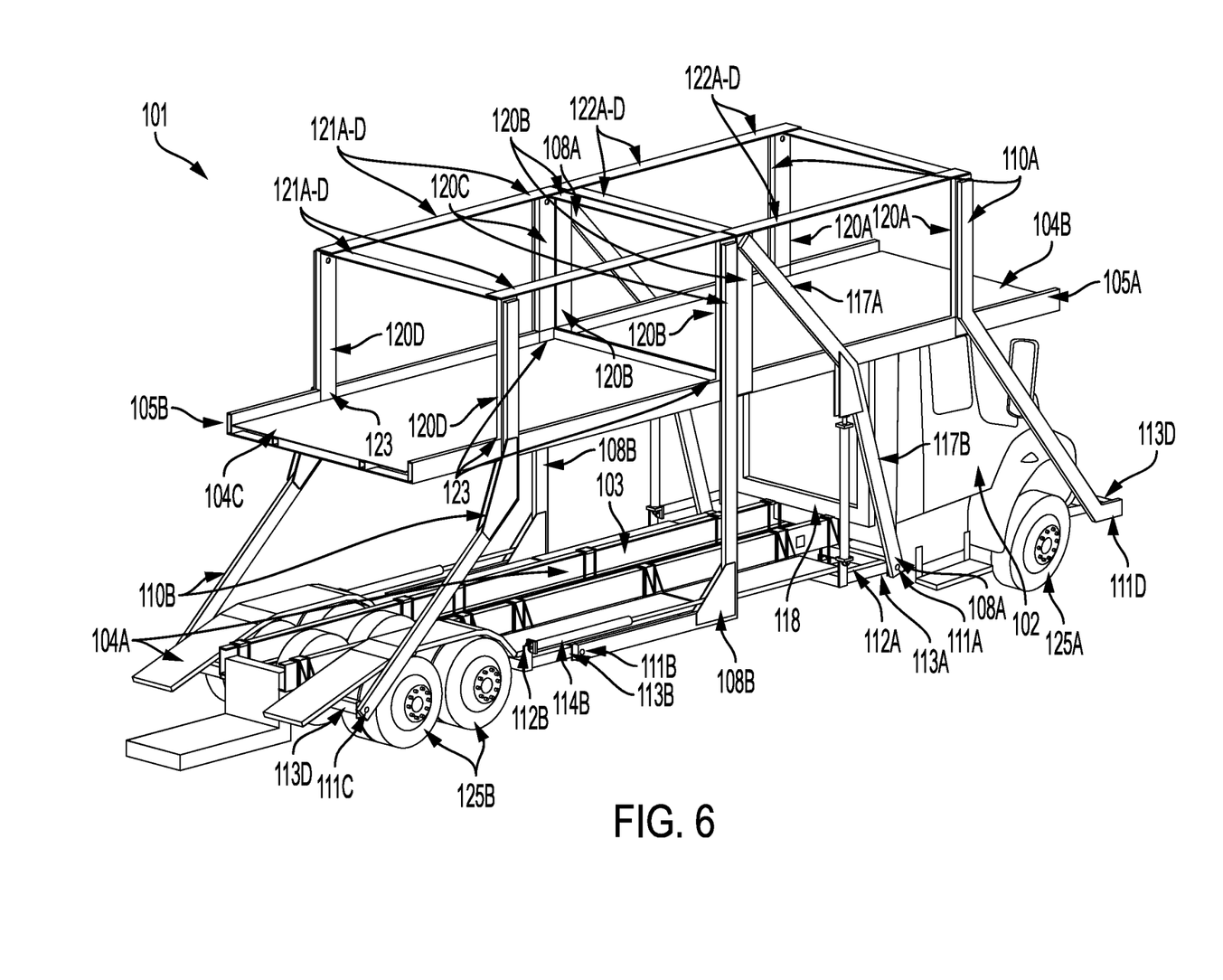
FIG. 6 illustrates a perspective view of a system including three platforms configured to load three vehicles in fully loaded positions of FIG. 5 in accordance with an embodiment of the disclosure.

The lifting arms 108A and the slave arms 110A are shaped or otherwise configured to lift the second platform 104B to a loaded configuration, as illustrated in FIGS. 5-6. The shape of the lifting arms can be adjusted to accommodate a particular customer's needs. Moving cars for example might benefit from a different shape for the lifting arms to accommodate the opening and closing of car doors, where moving freight might not require the same type of access.

The system 100 also includes actuator pivot points 112A that are attached on the chassis 103 behind cab 102, near the bottom of the head rack 118, as illustrated in FIG. 2-6. The actuator pivot points 112A are attached to brackets that move the pivot points to the extreme sides of the truck and are horizontally spaced to sufficiently accommodate the horizontal length of the platforms 104A and 104B. The actuator pivot points 112A are mounted to brackets 113A which are mounted on the chassis 103 of the transporting vehicle and spaced from the forward pivot points 111A for the lifting arms 108A.

The system 100 also includes a first hydraulic actuator 114A that is used for the two lifting arms 108A; i.e., to actuate the movement of the lifting arms 108A, which move the second platform 104B along an arc and move the second platform 104B from the unloaded to the loaded position and vice versa. The first hydraulic actuator 114A is attached to actuator pivot point 112A, which is near the forwarding pivot points 111A, and is attached to the lifting arms 108A to accommodate the lifting of the second platform 104B. The position of the actuator attachment depends on the shape and size of the lifting arm. In the illustration it is attached close to pivot point 111A on the bottom and the dog leg bend in the lifting arm on the top.

The system 100 also includes a third platform 104C, which in some embodiments structurally mimics a mirror image of the second platform 104B. The third platform 104C can be installed along the back of cab 102 and the same distance above the chassis 103 to load a third object or third vehicle 106C. The third platform 104C includes a first pair of vertical bars 120C and a second pair of vertical bars 120D extending upward from its planar base 105B (FIG. 6) as illustrated in FIG. 2. The second pair of vertical bars 120D of the third platform 104C are at a larger distance from rack 118 of cab 102 than the first pair of vertical bars 120C. These vertical bars are coupled to lifting arms and slave arms as described below such that the third platform 104C can be lifted by the lifting arms and slave arms. All of the pivot points can be adjusted to raise and lower the platforms as needed to adjust the loads height. The up and down movement may be facilitated by a vertical jack screw or hydraulic cylinder.

The system 100 also includes a second pair of lifting arms 108B coupled at backward pivot points 111B that are connected to the chassis 103 with bracket 113B (FIG. 6). The second pair of lifting arms 108B are attached at the top ends at pivot 116C which are coupled to the vertical bars 120C of the third platform 104C. The top ends of the second pair of vertical bars 120C of the third platform 104C are attached at the top ends at pivot points 116C of the second pair of lifting arms 108B, which have bottom ends coupled at backward pivot points 111B that hold the third platform 104C parallel to the backward pivot points 111C attached to brackets 113B that move the pivot points to the extreme sides of the truck and are attached to the chassis.

The system 100 also includes a second pair of slave arms 110B that have pivots at the top ends (pivots 116C) coupled to the top ends of the vertical bars 120C. The second pair of slave arms 110B are attached to backward pivot points 111C to brackets 113D that move the pivot points to the extreme sides of the truck and are attached to the chassis 103. The top ends of the slave arms 110B are attached to the vertical bars of third platform 104C at pivot points 116D. The second pair of slave arms 110B are coupled at backward pivot points 111C that hold the third platform 104C parallel to the chassis on backward pivot points (111) on the chassis 103.

The third platform 104C is suspended from vertical portions 119A of the lifting arms 108B. The vertical portions 119A allow height adjustments to accommodate positioning the vehicle 106C, when in the loaded position, and on the ground when in the unloaded position. In the loaded position, the third platform 104C is secured in an upper level above the first vehicle 106A (FIG. 5) or can be lowered to accommodate a single over height vehicle as an option. In this case, the third platform 104c can be lowered to the lever of platform 104A and loaded directly from the ground. In the unloaded position or the loading position, the third platform 104C can be positioned along the ground behind the back of the chassis 103 or it can be left on the transport vehicle and loaded directly from the ground.

The system 100 also includes actuator pivot points 112B that are attached on the bracket 113B which is attached to chassis 103 behind cab 102, near a back wheel 125B coupled to the chassis 103, as illustrated in FIG. 2-6. The actuator pivot points 112B are horizontally spaced to match the distance between the pivot points 116C and 116D. The pivot points 112B are mounted on brackets 113B which are attached to the chassis 103 and bring the pivot points to the extreme outside dimension of the transport vehicle and are spaced apart from backward pivot points 111B for actuating the lifting arms 108B.

The system 100 also includes a second pair of hydraulic actuators 114B that are used for the pair of lifting arms 108B to actuate the movement of the second pair of lifting arm 108B, which transport the third platform 104C along an arc and move the third platform 104C from the unloaded position to the loaded position. The second pair of hydraulic actuators 114B are attached to pivot points 112B which are attached to brackets 113B to bring the pivot points to the extreme outside dimension of the transport vehicle and are spaced a sufficient distance for actuating the lifting arms.

In some embodiments, the second pair of lifting arms 108B may be shaped differently from the first pair of lifting arms 108A to accommodate the third vehicle 106C. The second pair of slave arms 110B may be shaped differently from the first pair of slave arms 110A to accommodate the third vehicle 106C. Other such variations are contemplated.

The system 100 accommodates independent loading and unloading of the vehicle 106B over the front of cab 102. It will be appreciated by those skilled in the art that any of the platforms 104 such as the second platform 104B may load two small-sized vehicles next to each other if cab 102 is sized large enough. In addition, the system 100 can load and unload vehicles from a lower level and an upper level independently. For example, when loading vehicles on the upper level, the vehicles on the lower level do not need to be moved. The system 100 can also load/unload vehicles on the second platform 104B from the front and on the third platform 104C from the back independently. The loaded second platform 104B can be lifted in both horizontally and vertically simultaneously to the top of cab 102 by using the actuator 114A from the front of the truck. Likewise, the loaded third platform 104C can be lifted to the top by using the actuator 114B from the back of cab 102, either simultaneously or sequentially.

Moreover, it should be appreciated that each of the platforms 104 may be considered to be variants sub features of broader, transport components. In other words, transport components as described herein include platforms, but also include compartments for hauling freight or other non-vehicle objects.

Figure 3:
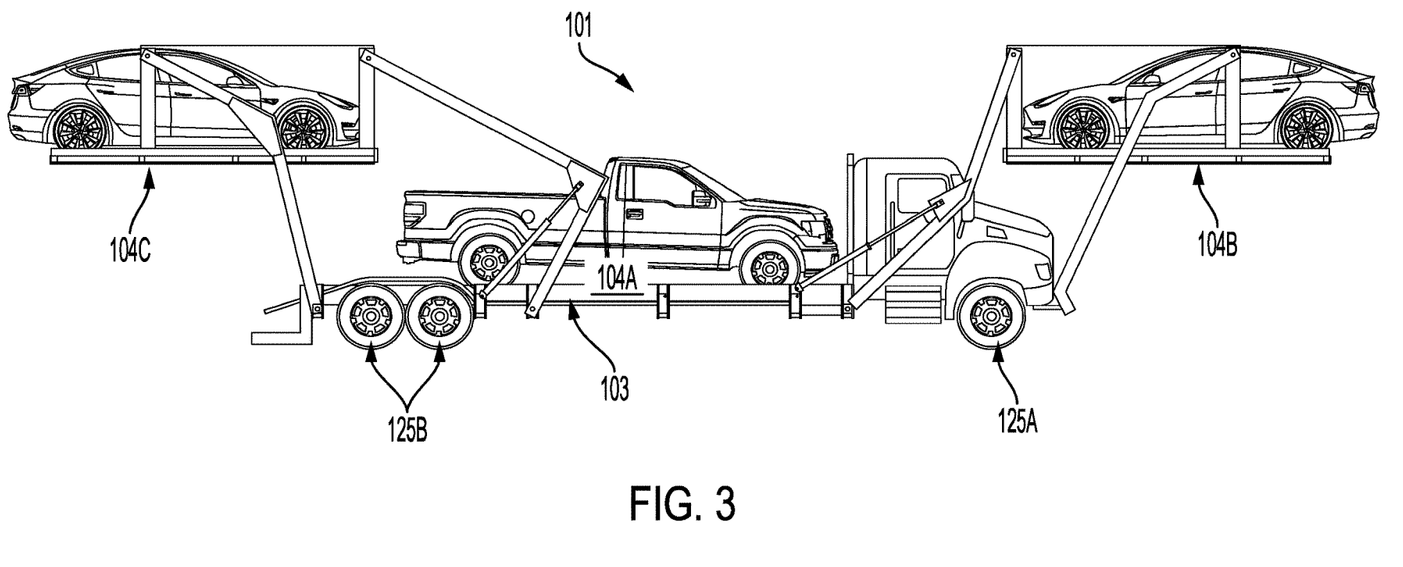
FIG. 3 illustrates a side view of the system including three platforms with three vehicles in half-loaded positions in accordance with an embodiment of the disclosure.
Figure 4:
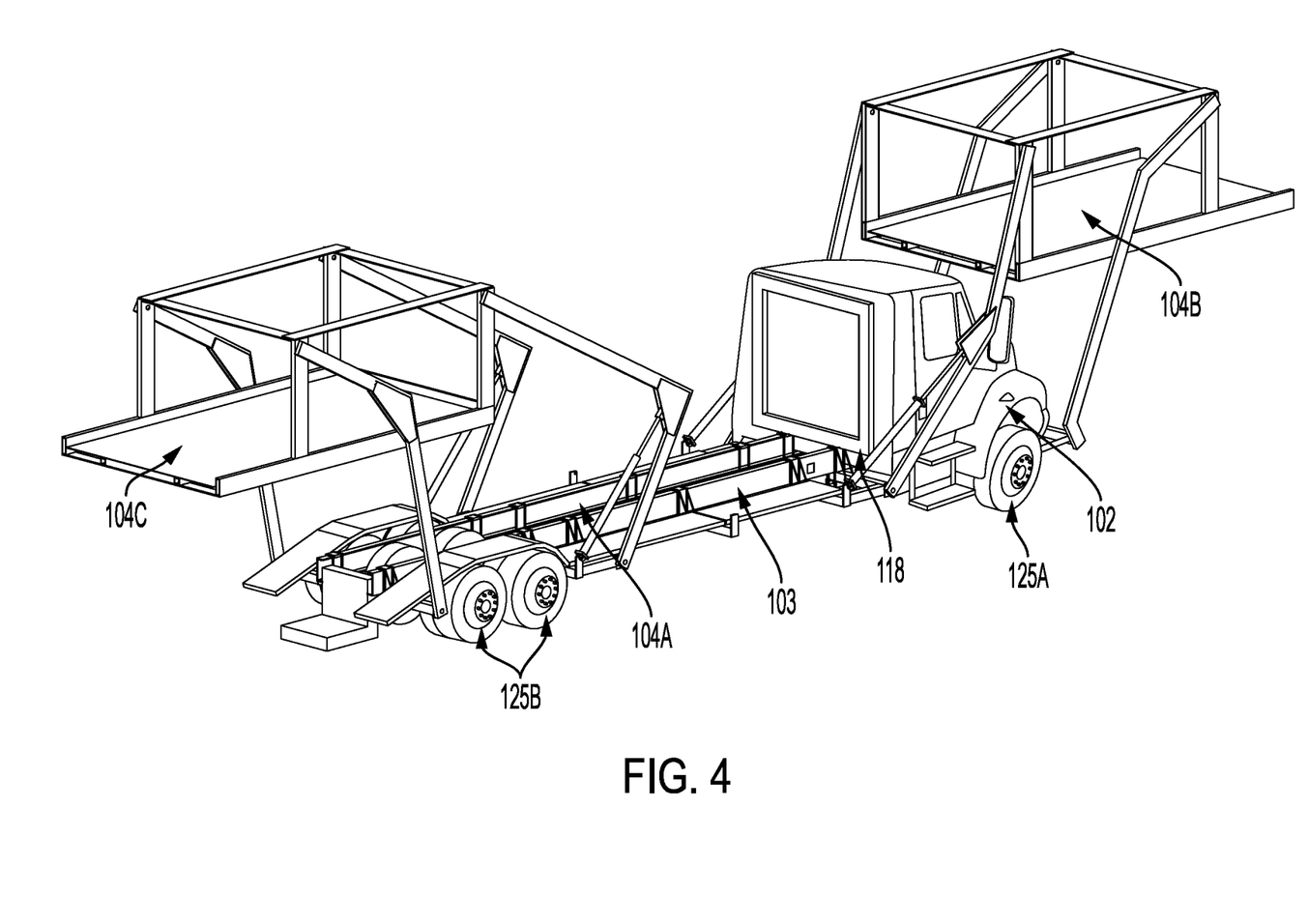
FIG. 4 illustrates a perspective view of the system including three platforms configured to load three vehicles in the half-loaded positions of FIG. 3 in accordance with an embodiment of the disclosure.

FIG. 3 illustrates a side view of a truck including three platforms with three vehicles in half-loaded positions in accordance with an embodiment of the disclosure. FIG. 4 illustrates a perspective view of the truck including three platforms with three vehicles in half-loaded positions of FIG. 3 in accordance with an embodiment of the disclosure. As illustrated in FIGS. 3-4, the lifting arms 108A are powered by the actuator 114A to lift the second platform 104B that loads the second vehicle 106B. The slave arms 110A support the opposite ends of the second platform 104B. Vehicle 106B is halfway to the loaded position. The lifting arms 108A provide lateral motion, vertical motion, and radial motion of the second platform 104B.

Likewise, the lifting arms 108B are powered by actuators 114B to lift the third platform 104C that loads the third vehicle 106C. The slave arms 110B support the opposite ends of the third platform 104C. The third platform 104C and the vehicle 106C are halfway to the loaded position. The lifting arms 108B provide lateral motion, vertical motion, and radial motion of the third platform 104C.

FIG. 5 illustrates a side view of the system 100 including three platforms (104) with three vehicles in fully loaded positions in accordance with an embodiment of the disclosure. FIG. 6 illustrates a perspective view of the position of system 100 of FIG. 5 devoid of the vehicles for a different perspective. As illustrated in FIG. 5, each of the first pair of slave arms 110A includes a first section 109A coupled to a second section 109B. The first section 109A can move relative to the second section 109B such that the angle between the first section 109A and the second section 109B can vary with the lifting position of the second platform 104B. The first section 109A is sized to have a length that is close to the height of the vehicle 106B. The second section 109B is sized to lift the second platform above cab 102.

Each of the lifting arms 108A includes a first section 117A coupled to a second section 117B. The first section 117A can move relative to the second section 117B such that the angle between the first section 117A and the second section 117B can also vary with the lifting position of the second platform 104B. The first section 117A and the second section 117B are sized to lift the second platform above cab 102 to be against the third platform 104C.

It will be appreciated by those skilled in the art that the shapes of the lifting arms and the slave arms may vary.

Note that the top of the head rack 118 also supports the bottom of the second platform 104B. Turning to the third platform 104C, the lifting arms 108B are shaped to provide vertical support for the third platform 104C in a backward loaded position, while slave arms 110B provide additional support for the platform 104C. Each of the lifting arms 108B includes a first section 119A coupled to a second section 119B. In the loaded position, the first section 119A of the lifting arm 108B is perpendicular to the second section 109B. The first section 119A is vertically positioned and is sized to the height of the first vehicle 106A and the third vehicle 106C. The second section 109B is horizontally positioned Each of the slave arms 110B includes a first section 121A coupled to a second section 121B. The first section 121A can move relative to the second section 121B such that the angle between the first section 121A and the second section 121B can vary with the lifting position of the third platform 104C. As illustrated in FIGS. 5-6, the second platform 104B is suspended from vertical portions 119A of the slave arms 110A. The vertical portions 119A and 121A allow height adjustments to accommodate positioning the vehicle 106C on the second platform, when in the loaded position, and on the ground when in the unloaded position. Platform 104C can be height adjusted with vertical jack screws inside the lifting arms 108B section 119A and 110B section 121A.

In the loaded position, the second platform 104B is secured above cab 102. In the unloaded position or the loading position, the second platform 104B is on the ground in front of cab 102.

In some aspects, the second platform and the third platform are configured to assume: a first configuration for loading the second vehicle and the third vehicle, in the first configuration the second platform positioned outside of a footprint of the transporting vehicle along the front side, and the third platform positioned outside the footprint of the transporting vehicle along the back side, and a second configuration for transporting the second vehicle and the third vehicle, in the second configuration the second platform and the third platform abutting over the transporting vehicle.

As illustrated in FIG. 6, in the first configuration and the second configuration, the second platform and the third platform are aligned along a common horizontal plane.

Also, as illustrated in FIG. 6, each of the second and third platform includes a planar base having four corners 123, four vertical bars 120A-B or 120C-D extending upward from the four corners of the planar base, and four horizontal bars 122A-D or 121A-D connected between four top ends of the four vertical bars 120A-B or 120C-D, respectively.

In some aspects, the planar base includes a rectangular shape as a bed for the first or second vehicle.

In some aspects, the first pair of lifting arms are at the same distance from the transporting vehicle, and the second pair of lifting arms are at the same distance from the transporting vehicle.

In some aspects, a pair of parallel slave arms are coupled to each of the second platform and the third platform, and the pair of slaving arms are at the same distance from the transporting vehicle.

In some aspects, each of the second and third platforms includes a rectangular prism-shaped compartment defined along the planar base.

In some aspects, the respective pair of parallel slave arms of the second platform have one ends coupled to two top ends of the vertical bars and an opposite end coupled to a first pair of fixed pivot points in front of the transporting vehicle.

In some aspects, the pair of parallel lifting arms of the second platform have one ends coupled to the top ends of the vertical bars of the second platform and opposite ends coupled to a second pair of fixed pivot points that are mounted on the chassis in a vertical position behind the cab.

In some aspects, the second pair of fixed pivot points are spaced sufficiently from the first pair of fixed pivot points for lifting the second platform from the front side.

In some aspects, the pair of parallel slave arms of the third platform have one end coupled to two top ends of the vertical bars of the second platform and an opposite end coupled to a third pair of fixed pivot points mounted on the chassis.

In some aspects, the pair of parallel lifting arms of the third platform have one end coupled to the top ends of the vertical bars and an opposite end coupled to a fourth pair of fixed pivot points mounted on the chassis.

In some aspects, the third pair of fixed pivot points and the fourth pair of pivot points are spaced sufficiently for lifting the third platform from the back side.

In some aspects, in the first position, the second platform and the third platform are positioned along a first level along a ground surface to load the second vehicle and the third vehicle.

In some aspects, the second platform is configured to load the second vehicle on a second level from the front side of the transporting vehicle, the second level being higher above the ground surface than the first level.

In some aspects, the third platform is configured to load the third vehicle on a second level from the back side of the transporting vehicle, the second level being higher above the ground surface than the first level.

In some aspects, the first platform includes a planar base defining a bed for the first vehicle.

In some aspects, the first, second, and third vehicle include one or more automobiles or boats.

Box Truck Example

The system 100 described herein may include and fully supports various other embodiments and variations. For example, the system 100 may take the form of a "box truck" system (not shown) for loading and transporting general freight. In this embodiment, the box truck system is configured to separate the space into several transporting components or compartments, e.g. three compartments, unlike placing freights on the floor of a single box truck. In this manner, like the platforms 104 described above, each of the three compartments of the subject box truck system can be accessed independently. The two upper compartments can also be lowered independently to the ground to allow to access the freights in the upper compartments.

In some aspects, any of the compartments (or platforms 104) may be a detachable or at least temporarily removable from the box truck system. Each of the compartments of the box truck assembly may include an enclosure that can be accessed by dropping the compartment to a ground surface and lifting the enclosure to provide access from all directions to the cargo corresponding to that compartment.

In some aspects, the box truck system includes a box truck as a transporting vehicle that may be similar to the transporting vehicle of the system 100 but configured for transporting objects such as freight instead of transporting vehicles. The box truck may access the freight in three separate compartments that are easily accessed independently without unloading the freight in a reverse order to the loading sequence.

In some aspects, these separate compartments of the box truck system may vary in temperatures. For example, some compartments may be refrigerated. Some compartments may be low temperature freezers. Some compartments may be dry space on the same box truck. In some aspects, each of the compartments may be detachable and re-attachable to the platform.

Additional Examples

The following examples are for illustration purposes only. It will be apparent to those skilled in the art that many modifications, both to materials and methods, may be practiced without departing from the scope of the disclosure.

In some aspects, a separate trailer is towed by a truck. The separate trailer may include four separate vehicle positions that can be accessed independently of each other.

Figure 7:
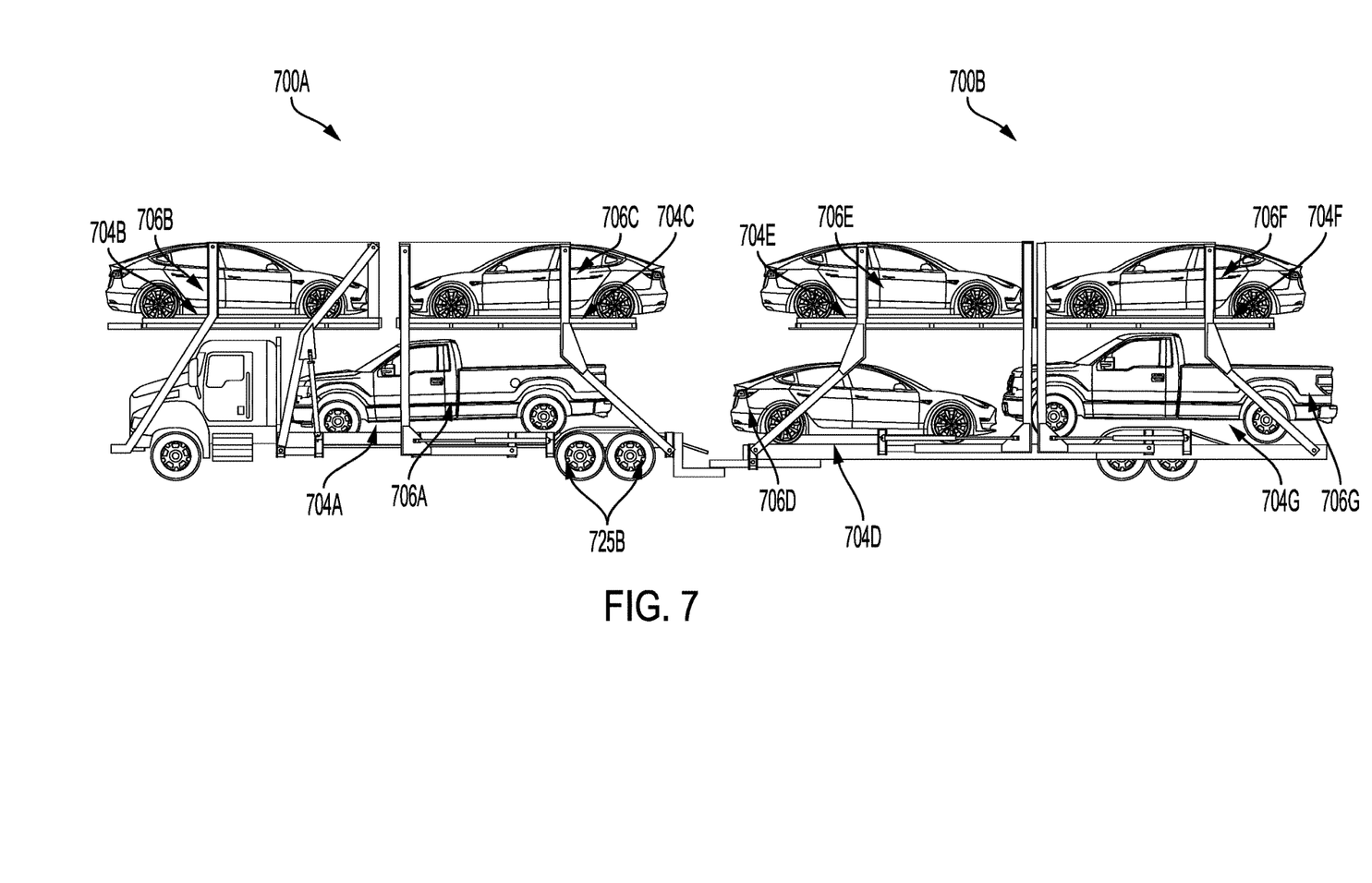
FIG. 7 is a side view of another example of a system including seven platforms with seven vehicles in fully loaded positions in accordance with an embodiment of the disclosure.
Figure 8:
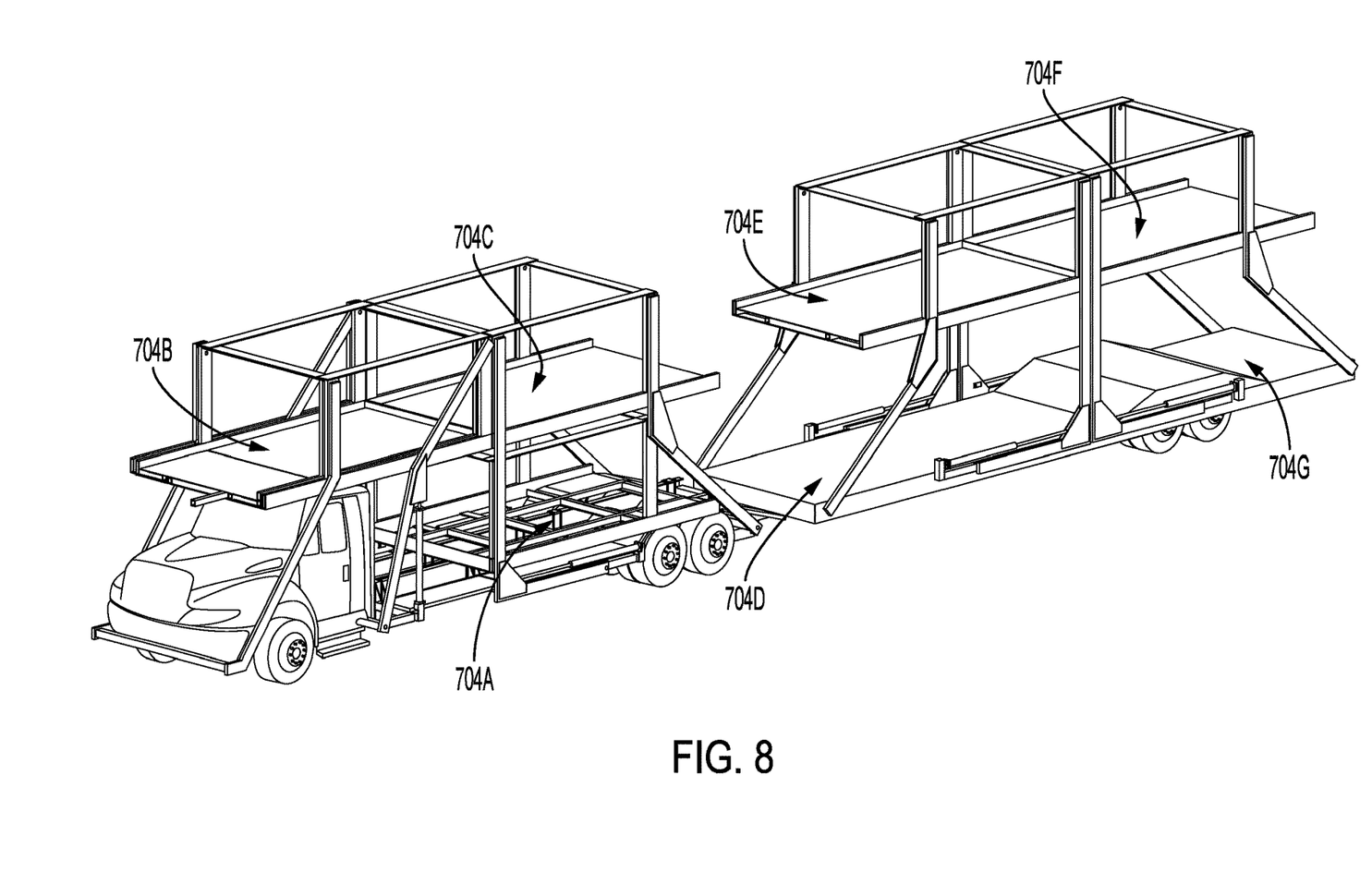
FIG. 8 is a perspective view of a system including seven platforms configured to load the seven vehicles of FIG. 7 in fully loaded positions in accordance with an embodiment of the disclosure.

Referring to FIGS. 7-8, while the system 100 defines at least three different platforms 104 and various positions or configurations thereof, variations of the system 100 may include, e.g., seven separate vehicle positions that can be accessed independently of each other. FIG. 7 is a side view of a system 700 similar to system 100 including seven platforms with seven vehicles in fully loaded positions in accordance with an embodiment of the disclosure. As shown, the system 700 includes a first portion 700A and a second portion 700B connected by joint 708. The first portion 700A includes the transporting vehicle 101 from system 100 and platforms 704A-G configured to load up to three vehicles 706A, 706B, and 706C. More specifically, the first portion 700A includes front wheel 725A, double back wheels 725B. The second portion 700B include platforms configured to upload four vehicles 706D, 706E, 706F, and 706G separately. For example, vehicles 706D and 706E can be loaded from the front of the second portion 700B, while vehicles 706F and 706G can be loaded from the back of the second portion 700B The second portion 700B also includes double back wheels 725C. FIG. 8 is a perspective view of a truck including seven platforms configured to load seven vehicles of FIG. 7 in fully loaded positions in accordance with an embodiment of the disclosure.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A loading and transport system with independently accessible loading position, comprising:
   a first platform configured for attachment to a chassis behind a cab of a transporting vehicle that loads and unloads a first vehicle along a back side of the transporting vehicle;
   a second platform configured to engage the transporting vehicle along a front side of the transporting vehicle that loads and unloads a second vehicle along a front side of the transporting vehicle opposite the back side;
   a first pair of lifting arms coupled to the second platform that lift the second platform from the front side of the transporting vehicle;
   a third platform configured to engage the transporting vehicle along the back side that loads and unloads a third vehicle;
   a second pair of lifting arms coupled to the third platform for lifting the third vehicle from the back side of the transporting vehicle; and
   two or more actuators that reposition the second and third platforms, wherein the first, second, and third platforms are accessible independently for loading and unloading the first, second, and third vehicles, respectively.

2. The system of claim 1, wherein the second platform and the third platform are configured to assume:
   a first configuration for loading or unloading the second vehicle and the third vehicle, in the first configuration the second platform positioned outside of a footprint of the transporting vehicle along the front side, and the third platform positioned outside the footprint of the transporting vehicle along the back side; and
   a second configuration for transporting the second vehicle and the third vehicle, in the second configuration the second platform and the third platform abutting over the transporting vehicle.

3. The system of claim 2, wherein in the first configuration and in the second configuration the second platform and the third platform are aligned along a common horizontal plane.

4. The system of claim 1, wherein each of the second and third platforms comprises a planar base having four corners, four vertical bars extending upward from the four corners of the planar base, and four horizontal bars connected between four top ends of the four vertical bars.

5. The system of claim 4, wherein the planar base comprises a rectangular shape as a bed for the first or second vehicle.

6. The system of claim 4, wherein the first pair of lifting arms are at the same distance from the transporting vehicle, and the second pair of lifting arms are at the same distance from the transporting vehicle.

7. The system of claim 4, wherein a pair of parallel slave arms are coupled to each of the second platform and the third platform, wherein the pair of saving arms are at the same distance from the transporting vehicle.

8. The system of claim 4, wherein each of the second and third platforms comprises a rectangular prism-shaped compartment defined along the planar base.

9. The system of claim 4, wherein the respective pair of parallel slave arms of the second platform include one end coupled to two top ends of the vertical bars and an opposite end coupled to a first pair of fixed pivot points in front of the transporting vehicle, and wherein the pair of parallel lifting arms of the second platform have one end coupled to the top ends of the vertical bars of the second platform and opposite ends coupled to a second pair of fixed pivot points that are mounted on the chassis in a vertical position behind the cab.

10. The system of claim 9, wherein the second pair of fixed pivot points are spaced a predetermined distance from the first pair of fixed pivot points sufficient for lifting the second platform from the front side.

11. The system of claim 4, wherein the pair of parallel slave arms of the third platform have one end coupled to two top ends of the vertical bars of the second platform and an opposite end coupled to a third pair of fixed pivot points mounted on the chassis, wherein the pair of parallel lifting arms of the third platform have one end coupled to the top ends of the vertical bars and an opposite end coupled to a fourth pair of fixed pivot points mounted on the chassis.

12. The system of claim 11, wherein the third pair of fixed pivot points and the fourth pair of pivot points are spaced sufficiently for lifting the third platform from the back side.

13. The system of claim 2, wherein in the first configuration, the second platform, and the third platform are positioned along a first level along a ground surface to load or unload the second vehicle and the third vehicle.

14. The system of claim 13, wherein the second platform is configured to load the second vehicle on a second level from the front side of the transporting vehicle, the second level being higher above the ground surface than the first level.

15. The system of claim 13, wherein the third platform is configured to load the third vehicle on a second level from the back side of the transporting vehicle, the second level being higher above the ground surface than the first level.

16. The system of claim 1, wherein the first, second, and third vehicles comprise one or more automobiles or boats.

17. A method of making a trailer system, comprising:
   forming a first platform configured to engage a transporting vehicle that loads and unloads a first vehicle along a back side of the transporting vehicle;
   forming a second platform configured to engage the transporting vehicle along a front side of the transporting vehicle that loads and unloads a second vehicle along the front side of the transporting vehicle opposite the back side;
   coupling a first pair of lifting arms to the second platform that lift the second platform from the front side of the transporting vehicle;
   forming a third platform configured to engage the transporting vehicle along the back side that loads and unloads a third vehicle;
   coupling a second pair of lifting arms to the third platform for lifting the third vehicle from the back side of the transporting vehicle; and
   operatively engaging two or more actuators along the first pair of lifting arms and the second pair of lifting arms, the two or more actuators configured to reposition the second and third platforms such that the first, second, and third platforms are accessible independently for loading and unloading the first, second, and third vehicles, respectively.

18. A trailer system, comprising:
   a first transporting component configured to engage a transporting vehicle that loads and unloads a first object along a back side of the transporting vehicle;
   a second transporting component configured to engage the transporting vehicle along a front side of the transporting vehicle opposite the back side, the second transporting component adapted to load and unload a second object along the front side of the transporting vehicle;

a first pair of lifting arms coupled to the second transporting component that lift the second transporting component from the front side of the transporting vehicle;
   a third transporting component configured to engage the transporting vehicle along the back side that loads and unloads a third object;
   a second pair of lifting arms coupled to the third platform for lifting the third object from the back side of the transporting vehicle; and
   two or more actuators that reposition the second and third platforms, wherein the first, second, and third platforms are accessible independently for loading and unloading the first, second, and third objects, respectively.

19. The trailer system of claim 18, wherein each of the first transporting component, the second transporting component, and the third transporting component define a platform for receiving a vehicle.

20. The trailer system of claim 18, wherein each of the first transporting component, the second transporting component, and the third transporting component define a compartment to ship freight.

* * * * *